US011698105B2

(12) United States Patent
Yonai et al.

(10) Patent No.: US 11,698,105 B2
(45) Date of Patent: Jul. 11, 2023

(54) SURFACE PROCESSING METHOD OF DISK MEMBER OF SEALING APPARATUS, AND SEALING APPARATUS

(71) Applicant: NOK CORPORATION, Tokyo (JP)

(72) Inventors: Hisato Yonai, Fukushima (JP); Yuya Sakano, Fukushima (JP); Masahiko Inoue, Fukushima (JP)

(73) Assignee: NOK CORPORATION, Tokyo (JP)

( * ) Notice: Subject to any disclaimer, the term of this patent is extended or adjusted under 35 U.S.C. 154(b) by 626 days.

(21) Appl. No.: 16/754,536

(22) PCT Filed: Oct. 24, 2019

(86) PCT No.: PCT/JP2019/041636
§ 371 (c)(1),
(2) Date: Apr. 8, 2020

(87) PCT Pub. No.: WO2020/090602
PCT Pub. Date: May 7, 2020

(65) Prior Publication Data
US 2021/0215200 A1 Jul. 15, 2021

(30) Foreign Application Priority Data

Oct. 31, 2018 (JP) .................................. 2018-205327

(51) Int. Cl.
*B24B 7/10* (2006.01)
*F16C 33/74* (2006.01)
(52) U.S. Cl.
CPC ................ *F16C 33/74* (2013.01); *B24B 7/10* (2013.01)
(58) Field of Classification Search
CPC .... F16C 33/74; B24B 7/10; F16J 15/32; F16J 15/3204; F16J 15/3232; F16J 15/3248; F16J 15/3256
See application file for complete search history.

(56) References Cited

U.S. PATENT DOCUMENTS 4,974,860 A * 12/1990 Anzue .................... F16J 15/164
277/377
4,986,552 A * 1/1991 Anzue .................. F16J 15/3456
277/400
(Continued)

FOREIGN PATENT DOCUMENTS

CN       1046025     10/1990
CN       102016365    4/2011
(Continued)

OTHER PUBLICATIONS

Office Action in Corresponding CN Application No. 201980004919.9, dated Feb. 7, 2022, along with an English translation thereof.
(Continued)

*Primary Examiner* — Gilbert Y Lee
(74) *Attorney, Agent, or Firm* — Greenblum & Bernstein, P.L.C.

(57) ABSTRACT

A sealing apparatus which is capable of preventing static leakage of a target to be sealed without increasing sliding resistance with respect to a shaft, and a surface processing method of a disk member of the sealing apparatus which is capable of processing a surface of the disk member, such as a slinger, provided at the sealing apparatus. A surface processing method of a disk member of a sealing apparatus for forming a plurality of fine spiral grooves on a surface of the disk member provided at the sealing apparatus has a grinding member having a plurality of fine projections that is moved to an outer edge side while the grinding member is pressed against the surface of the disk member which relatively rotates around an axis, and the sealing apparatus includes a slinger at which a plurality of fine spiral grooves are randomly formed on another side surface of a flange portion.

6 Claims, 10 Drawing Sheets

(56) References Cited

U.S. PATENT DOCUMENTS

| | | | |
|---|---|---|---|
| 5,692,757 | A | 12/1997 | Straub |
| 6,170,834 | B1 | 1/2001 | Vogt |
| 11,215,284 | B2* | 1/2022 | Ito .................... F16J 15/3204 |
| 2011/0006485 | A1 | 1/2011 | Nakagawa |
| 2013/0087978 | A1 | 4/2013 | Nakagawa |
| 2013/0175763 | A1* | 7/2013 | Berdichevsky ...... F16J 15/3244 277/552 |
| 2017/0092504 | A1 | 3/2017 | Kubo et al. |
| 2019/0277340 | A1 | 9/2019 | Shuto et al. |
| 2020/0096112 | A1* | 3/2020 | Ito .................... F16J 15/3204 |

FOREIGN PATENT DOCUMENTS

| | | |
|---|---|---|
| CN | 102990308 | 3/2013 |
| CN | 203009373 | 6/2013 |
| CN | 106933061 | 7/2017 |
| CN | 107524787 | 12/2017 |
| JP | S57-157451 | 10/1982 |
| JP | 4-088773 | 7/1992 |
| JP | 4-321880 | 11/1992 |
| JP | 8-254213 | 10/1996 |
| JP | 10-503266 | 3/1998 |
| JP | 2012-166326 | 9/2012 |
| JP | 2017-069271 | 4/2017 |
| WO | 2018/097233 | 5/2018 |

OTHER PUBLICATIONS

Office Action Issued in Corresponding CN Patent Application No. 201980004919.9, dated May 31, 2022, along with an English translation thereof.

Extended European Search Report Issued in Corresponding Ep Application No. 19868157.9, dated Jul. 4, 2022.

China Office Action received in CN Application No. 201980004919. 9, dated Jul. 22, 2021.

Korean Office Action received in KR Application No. 10-2020-7010225, dated Jul. 27, 2021.

International Search Report issued in International Patent Application No. PCT/JP2019/041636, dated Dec. 17, 2019.

Written Opinion issued in International Patent Application No. PCT/JP2019/041636, dated Dec. 17, 2019.

International Preliminary Report on Patentability issued in PCT/JP2019/041636 containing the English translation of the Written Opinion of the International Search Authority, dated Apr. 27, 2021.

Office Action issued in Corresponding JP Patent Application No. 2020-504052, dated Apr. 26, 2023, along with an English translation thereof.

Office Action issued in Corresponding JP Patent Application No. 2020-504052, dated Feb. 14, 2023, along with an English translation thereof.

* cited by examiner

SURFACE PROCESSING METHOD OF DISK MEMBER OF SEALING APPARATUS, AND SEALING APPARATUS

TECHNICAL FIELD

The present invention relates to a surface processing method of a disk member of a sealing apparatus, for forming a plurality of fine spiral grooves on a surface of the disk member provided at the sealing apparatus, and a sealing apparatus to realize sealing between a shaft and a hole into which this shaft is to be inserted.

BACKGROUND ART

In a vehicle, general-purpose machine, or the like, in order to prevent leakage of a target to be sealed such as, for example, a lubricant, and in order to seal a gap between a shaft and a hole into which this shaft is to be inserted, a sealing apparatus has been conventionally used. In such a sealing apparatus, sealing between the shaft and the sealing apparatus is realized by a seal lip being brought into contact with the shaft or an annular member attached to the shaft. Among such sealing apparatuses, there is a so-called end-face contact-type sealing apparatus. The end-face contact-type sealing apparatus prevents leakage of a target to be sealed by bringing a seal lip extending along a shaft into contact with a slinger attached to the shaft.

Among conventional end-face contact-type sealing apparatuses, there is an apparatus in which sealing properties are improved by providing a groove at a slinger that a seal lip contacts and sending a target to be sealed such as oil to a side of the target to be sealed along with air on an atmosphere side by pumping action of the groove while the slinger is rotating. In such a conventional end-face contact-type sealing apparatus, while a target to be sealed which has oozed can be returned to the side of the target to be sealed by pumping action while the slinger is rotating as described above, when the slinger is stopped, there is a case where so-called static leakage which is leakage of the target to be sealed from a gap formed between the groove of the slinger and an end-face lip, may occur.

To prevent this static leakage, among conventional end-face contact-type sealing apparatuses, there is an apparatus in which a seal lip which contacts a slinger is further provided on an inner periphery side of a seal lip to prevent a target to be sealed which has oozed by static leakage occurring at the seal lip on an outer periphery side from further leaking to outside (see, for example, Patent Literature 1).

DOCUMENT LIST

Patent Literature

Patent Literature 1: Japanese Utility Model Laid Open No. 4-88773

SUMMARY OF INVENTION

Technical Problem

In such a conventional end-face contact-type sealing apparatus, while static leakage is prevented by the seal lip on the inner periphery side as described above, two seal lips contact the slinger, which increases sliding resistance with respect to a shaft while the slinger is rotating. In recent years, in a sealing apparatus, it is required to reduce sliding resistance with respect to the shaft to meet a demand for reducing fuel consumption of a vehicle, or the like, and in an end-face contact-type sealing apparatus, a structure is required which can reduce sliding resistance with respect to the shaft while preventing static leakage.

The present invention has been made in view of the above-described problem, and it is an object of the present invention to provide a sealing apparatus which can prevent static leakage of a target to be sealed without increasing sliding resistance with respect to a shaft, and a surface processing method of a disk member of the sealing apparatus, which is to be used for easily processing a surface of the disk member such as a slinger provided at the sealing apparatus.

Solution to Problem

To achieve the above-described object, a surface processing method of a disk member of a sealing apparatus according to the present invention is a surface processing method of a disk member of a sealing apparatus for forming a plurality of fine spiral grooves on a surface of the disk member provided at the sealing apparatus, and is characterized by moving a grinding member having a plurality of fine projections to an outer edge side while pressing the grinding member against the surface of the disk member which relatively rotates around a shaft.

In a surface processing method of a disk member of a sealing apparatus according to one aspect of the present invention, it is preferable that a surface of the grinding member, which abuts on the surface of the disk member is a polishing material.

In a surface processing method of a disk member of a sealing apparatus according to one aspect of the present invention, after the disk member rotates one or more revolutions while the grinding member is pressed against the surface of the disk member, the grinding member can be moved to the outer edge side of the disk member.

In a surface processing method of a disk member of a sealing apparatus according to one aspect of the present invention, the disk member is a slinger which is provided at a sealing apparatus for realizing sealing of an annular gap between a shaft and a hole into which the shaft is to be inserted, along with a sealing apparatus body fitted into the hole, and which is attached to the shaft, the sealing apparatus body includes a reinforcing ring which is annular around an axis line, and an elastic body portion which is formed with an elastic body attached to the reinforcing ring and which is annular around the axis line, the slinger includes a flange portion which is a portion extending toward an outer periphery side and annular around the axis line, the elastic body portion includes an end-face lip which is a lip extending toward one side in an axis line direction, contacting another side surface of the flange portion in the axis line direction and annular around the axis line, and a surface against which the grinding member is to be pressed can be made the other side surface of the flange portion of the slinger.

Meanwhile, a sealing apparatus according to the present invention is a sealing apparatus for sealing an annular gap between a shaft and a hole into which the shaft is to be inserted, and is characterized in that the sealing apparatus includes a sealing apparatus body fitted into the hole, and a slinger attached to the shaft, the sealing apparatus body includes a reinforcing ring which is annular around an axis line, and an elastic body portion which is formed with an elastic body attached to the reinforcing ring and which is annular around the axis line, the slinger includes a flange portion which is a portion extending toward an outer periphery side and which is annular around the axis line, the elastic body portion includes an end-face lip which is a lip extending toward one side in an axis line direction, contacting another side surface of the flange portion in the axis line direction, and annular around the axis line, and a plurality of fine spiral grooves are randomly formed on the other side surface of the flange portion of the slinger.

In a sealing apparatus according to one aspect of the present invention, it is preferable that a depth of the grooves falls within a range between 2 μm and 20 μm.

Effects of Invention

According to a surface processing method of a disk member of a sealing apparatus according to the present invention, it is possible to easily form a plurality of fine spiral grooves on a surface of the disk member. Further, by processing a surface of a slinger using the surface processing method of the disk member of the sealing apparatus according to the present invention, it is possible to provide a sealing apparatus which can prevent static leakage of a target to be sealed without increasing sliding resistance with respect to a shaft.

DESCRIPTION OF EMBODIMENTS

Embodiments of the present invention will be described blow with reference to the drawings.

Figure 1:
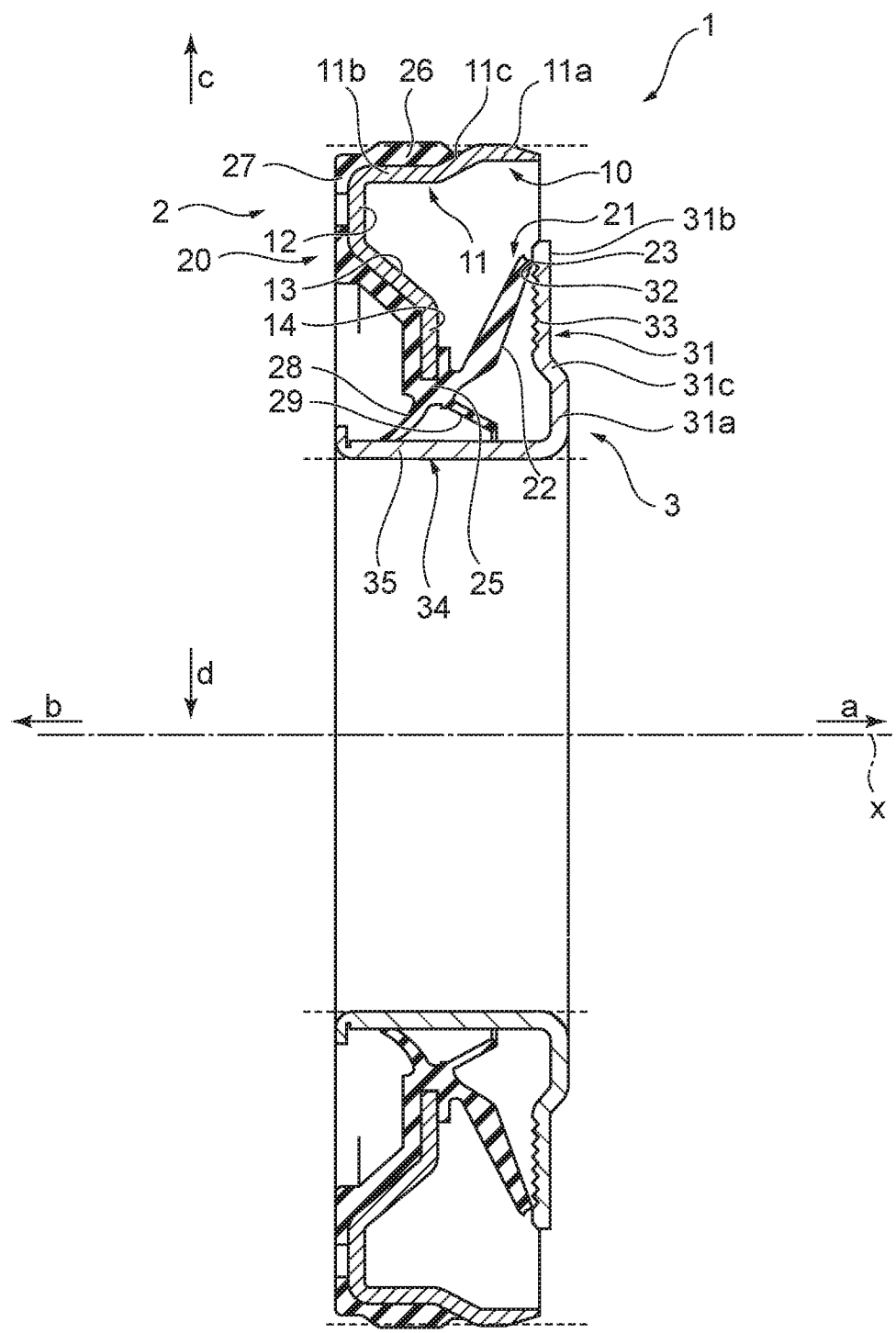
FIG. 1 A cross-sectional view on a cross-section along an axis line for illustrating a schematic configuration of a sealing apparatus ultimately obtained according to an embodiment of the present invention.
Figure 2:
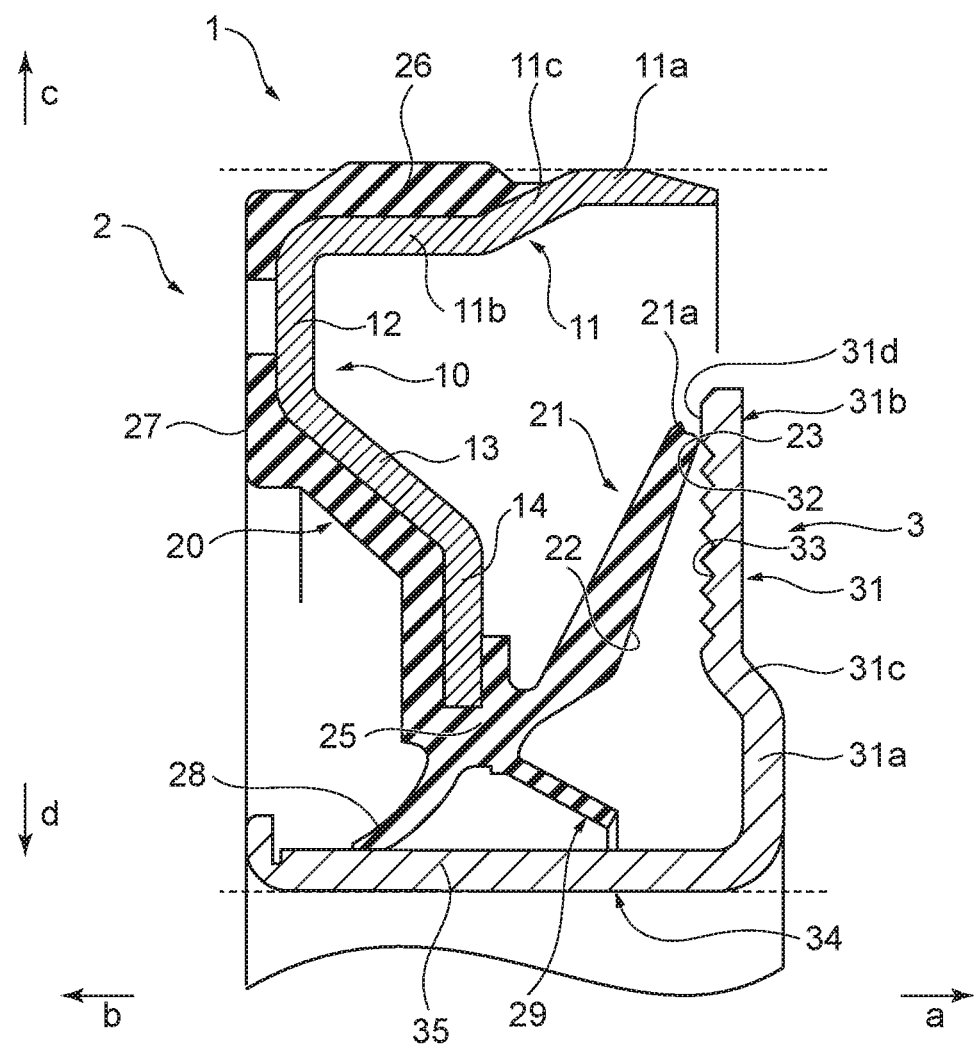
FIG. 2 A partially enlarged cross-sectional diagram illustrating enlarged part of the cross-section along the axis line of the sealing apparatus in FIG. 1.

FIG. 1 is a cross-sectional diagram on a cross-section along an axis line x for illustrating a schematic configuration of a sealing apparatus 1 according to an embodiment of the present invention, and FIG. 2 is a partially enlarged cross-sectional diagram illustrating enlarged part of the cross-section along the axis line x of the sealing apparatus 1.

The sealing apparatus 1 according to the embodiment of the present invention is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted in a vehicle or general-purpose machine. For example, the sealing apparatus is used to seal annular space between a crank shaft of an engine and a crank hole which is a shaft hole formed at a front cover, a cylinder block and a crank case. Note that targets to which the sealing apparatus 1 is applied are not limited to the above.

In the following description, for the purpose of illustration, a direction of an arrow a (see FIG. 1) in an axis line x direction (one side in the axis line direction) is set as an inner side, and a direction of an arrow b (see FIG. 1) in the axis line x direction (another side in the axis line direction) is set as an outer side. More specifically, the inner side is a side of space to be sealed (side of a target to be sealed) and a side of space where a target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 1) is set as an outer periphery side, and a direction approaching the axis line x (a direction of an arrow d in FIG. 1) is set as an inner periphery side.

As illustrated in FIG. 1, the sealing apparatus 1 includes a sealing apparatus body 2 fitted into a hole as an attachment target which will be described later and a slinger 3 attached to a shaft 52 as an attachment target which will be described later. The sealing apparatus body 2 includes a reinforcing ring 10 which is annular around the axis line x, and an elastic body portion 20 which is formed with an elastic body attached to the reinforcing ring 10, and which is annular around the axis line x. The slinger 3 includes a flange portion 31 which is a portion extending toward the outer periphery side (the direction of the arrow c) and annular around the axis line x. The elastic body portion 20 includes an end-face lip 21 which is a lip extending toward one side (inner side, the direction of the arrow a) in an axis line x direction, contacting the surface (outer side surface 31d) of another side (outer side, a side of the direction of the arrow b) in the axis line direction x of the flange portion 31 and which is annular around the axis line x. An infinite number of (a plurality of) fine grooves 33 are formed on the outer side surface 31d of the flange portion 31 of the slinger 3. The respective configurations of the sealing apparatus body 2 and the slinger 3 of the sealing apparatus 1 will be specifically described below.

As illustrated in FIG. 1 and FIG. 2, in the sealing apparatus body 2, the reinforcing ring 10 is an annular metal member which is centered on or substantially centered on the axis line x and is formed so that the sealing apparatus body 2 is pressed, engaged and fitted into a shaft hole of a housing which will be described later. The reinforcing ring 10 includes, for example, a cylindrical portion 11 which is a cylindrical portion located on the outer periphery side, a disk portion 12 which is a hollow disk-shaped portion extending from a tip portion on the outer side of the cylindrical portion 11 to the inner periphery side, a conical ring portion 13 which is a conical cylindrical annular portion extending from a tip portion on the inner periphery side of the disk portion 12 to the inner side and the inner periphery side, and a disk portion 14 which is a hollow disk-shaped portion extending in a radial direction from a tip portion on the inner side or the inner periphery side of the conical ring portion 13 to the inner periphery side and reaching a tip portion on the inner periphery side of the reinforcing ring 10. More specifically, the cylindrical portion 11 of the reinforcing ring 10 includes an outer periphery side cylindrical portion 11a which is a cylindrical or substantially cylindrical portion located on the outer periphery side, an inner periphery side cylindrical portion 11b which is a cylindrical or substantially cylindrical portion extending on the outer side and the inner periphery side of the outer periphery side cylindrical portion 11a, and a connecting portion 11c which is a portion connecting the outer periphery side cylindrical portion 11a and the inner periphery side cylindrical portion 11b. The outer periphery side cylindrical portion 11a of the cylindrical portion 11 is fitted into the shaft hole 51 so that, when the sealing apparatus body 2 is fitted into the shaft hole 51 of the housing 50 (FIG. 3) which will be described later, the axis line x of the sealing apparatus body 2 matches an axis line of the shaft hole 51. An elastic body portion 20 is attached to the reinforcing ring 10 from a substantially outer periphery side and the outer side, so as to reinforce the elastic body portion 20 with a reinforcing ring 10.

As illustrated in FIG. 1 and FIG. 2, the elastic body portion 20 includes a base portion 25 which is a portion attached to a tip portion on the inner periphery side of the disk portion 14 of the reinforcing ring 10, a gasket portion 26 which is a portion attached to the cylindrical portion 11 of the reinforcing ring 10 from the outer periphery side, and a rear cover portion 27 which is a portion attached to the reinforcing ring 10 between the base portion 25 and the gasket portion 26 from the outer side. More specifically, as illustrated in FIG. 2, the gasket portion 26 is attached to the inner periphery side cylindrical portion 11b of the cylindrical portion 11 of the reinforcing ring 10. Further, an outer diameter of the gasket portion 26 is greater than a diameter of an inner periphery surface 51a (see FIG. 4) of the shaft hole 51 which will be described later. Therefore, in the case where the sealing apparatus body 2 is fitted into the shaft hole 51 which will be described later, the gasket portion 26 is compressed in a radial direction between the inner periphery side cylindrical portion 11b of the reinforcing ring 10 and the shaft hole 51 and seals a gap between the shaft hole 51 and the inner periphery side cylindrical portion 11b of the reinforcing ring 10. By this means, space between the sealing apparatus body 2 and the shaft hole 51 is sealed. The gasket portion 26 does not have to be have an outer diameter greater than the diameter of the inner periphery surface of the shaft hole 51 over the whole axis line x direction, and may have the outer diameter partially greater than the diameter of the inner periphery surface of the shaft hole 51. For example, an annular concave portion whose tip has a diameter greater than the diameter of the inner periphery surface 51a of the shaft hole 51 may be formed on a surface on the outer periphery side of the gasket portion 26.

Further, at the elastic body portion 20, the end-face lip 21 extends from the base portion 25 to the inner side (direction of the arrow a) in an annular shape centered on or substantially centered on the axis line x. In a usage state where the sealing apparatus 1 is attached at a desired position in the attachment target, the end-face lip 21 is formed so that the slinger contact portion 23 on an inner periphery surface 22 which is a surface on an inner periphery side of the end-face lip 21 contacts the flange portion 31 of the slinger 3 from the outer side with a predetermined interference. The end-face lip 21 has, for example, a conical cylindrical shape whose diameter becomes greater toward the inner side (direction of the arrow a) in the axis line x direction. That is, as illustrated in FIG. 1 and FIG. 2, the end-face lip 21 extends obliquely with respect to the axis line x from the base portion 25 to the inner side and the outer periphery side on a cross-section along the axis line x (hereinafter, also simply referred to as a "cross-section").

Further, the elastic body portion 20 includes a dust lip 28 and an intermediate lip 29. The dust lip 28 is a lip extending from the base portion 25 toward the axis line x, extends from the base portion 25 in an annular shape centered on or substantially centered on the axis line x, and is formed so that, in a state where the sealing apparatus 1 is used which will be described later, a tip portion contacts the slinger 3 from the outer periphery side with a predetermined tab for fastening. The dust lip 28 has, for example, a conical cylindrical shape whose diameter becomes smaller toward the outer side (direction of the arrow b) in the axis line x direction. The dust lip 28 prevents a foreign matter such as dust and moisture from intruding inside of the sealing apparatus 1 from the outer side which is an opposite side of a side of a target to be sealed in the usage state. The dust lip 28 may be formed so as not to contact the slinger 3 in the state where the sealing apparatus 1 is used.

As illustrated in FIG. 2, the intermediate lip 29, which is a lip extending from the base portion 25 toward the inner side to form a cross-section having a substantially L shape, extends from the base portion 25 in an annular shape centered on or substantially centered on the axis line x direction, and forms an annular concave portion which opens toward the inner side between the intermediate lip 29 and the base portion 25. The intermediate lip 29 does not contact the slinger 3 in a state where the sealing apparatus 1 is used. The intermediate lip 29 is formed to, in the usage state, in the case where a target to be sealed oozes inside over the slinger contact portion 23 where the end-face lip 21 contacts the slinger 3, prevent this target to be sealed which has oozed from leaking out on the dust lip 28 side. The intermediate lip 29 may have other shapes, and may, for example, have a conical cylindrical shape whose diameter becomes smaller toward the inner side in the axis line x direction. The intermediate lip 29 may be formed so that a tip of the intermediate lip 29 contacts the slinger 3.

As described above, the elastic body portion 20 includes the end-face lip 21, the base portion 25, the gasket portion 26, the rear cover portion 27, the dust lip 28 and the intermediate lip 29, respective portions are integrated, and the elastic body portion 20 is integrally formed with the same material. Note that the shape of the elastic body portion 20 is not limited to the above-described shape, and may be various shapes in accordance with application targets.

The above-described reinforcing ring 10 is formed with a metal material, and this metal material can include, for example, stainless steel and SPCC (steel plate cold commercial). Further, an elastic body of the elastic body portion 20 includes, for example, various kinds of rubber materials. Various kinds of rubber materials can include, for example, synthetic rubber such as nitrile rubber (NBR), hydrogenated nitrile rubber (H-NBR), acryl rubber (ACM) and fluorine-containing rubber (FKM).

The reinforcing ring 10 is manufactured through, for example, press work or forging, and the elastic body portion 20 is molded through cross-linking (vulcanization) molding using a mold. Upon this cross-linking molding, the reinforcing ring 10 is disposed in the mold, the elastic body portion 20 is adhered to the reinforcing ring 10 through cross-linking adhesion, and the elastic body portion 20 and the reinforcing ring 10 are integrally molded.

The slinger 3 is an annular member attached to the shaft in a state where the sealing apparatus 1 is used which will be described later, and is an annular member centered on or substantially centered on the axis line x. The slinger 3 has a cross-section having a substantially L shape, and includes the flange portion 31 and the cylindrical or substantially cylindrical portion 34 which is connected to an end portion on the inner periphery side of the flange portion 31 and which extends in the axis line x direction.

The flange portion 31 specifically includes an inner periphery side disk portion 31a having a hollow disk shape or a substantially hollow disk shape extending from the cylindrical portion 34 in the radial direction, an outer periphery side disk portion 31b in a hollow disk shape or a substantially hollow disk shape which expands on the outer periphery side of the inner periphery side disk portion 31a and which extends in the radial direction, and a connecting portion 31c which connects an end portion on the outer periphery side of the inner periphery side disk portion 31a and an end portion on the inner periphery side of the outer periphery side disk portion 31b. The outer periphery side disk portion 31b is located outer side of the inner periphery side disk portion 31a in the axis line x direction. Note that the shape of the flange portion 31 is not limited to the above-described shape, and may be various shapes in accordance with an application target. For example, the flange portion 31 does not have to include the inner periphery side disk portion 31a and the connecting portion 31c, and the outer periphery side disk portion 31b may extend to the cylindrical portion 34 and may be connected to the cylindrical portion 34, and may be a portion in a hollow disk shape or a substantially hollow disk shape extending from the cylindrical portion 34 in the radial direction.

The lip contact portion 32 which is a portion where the slinger 3 contacts the end-face lip 21 is located on the outer side surface 31d which is a surface facing the outer side of the outer periphery side disk portion 31b at the flange portion 31. It is preferable that the outer side surface 31d is a surface along a plane expanding in the radial direction.

Figure 3:
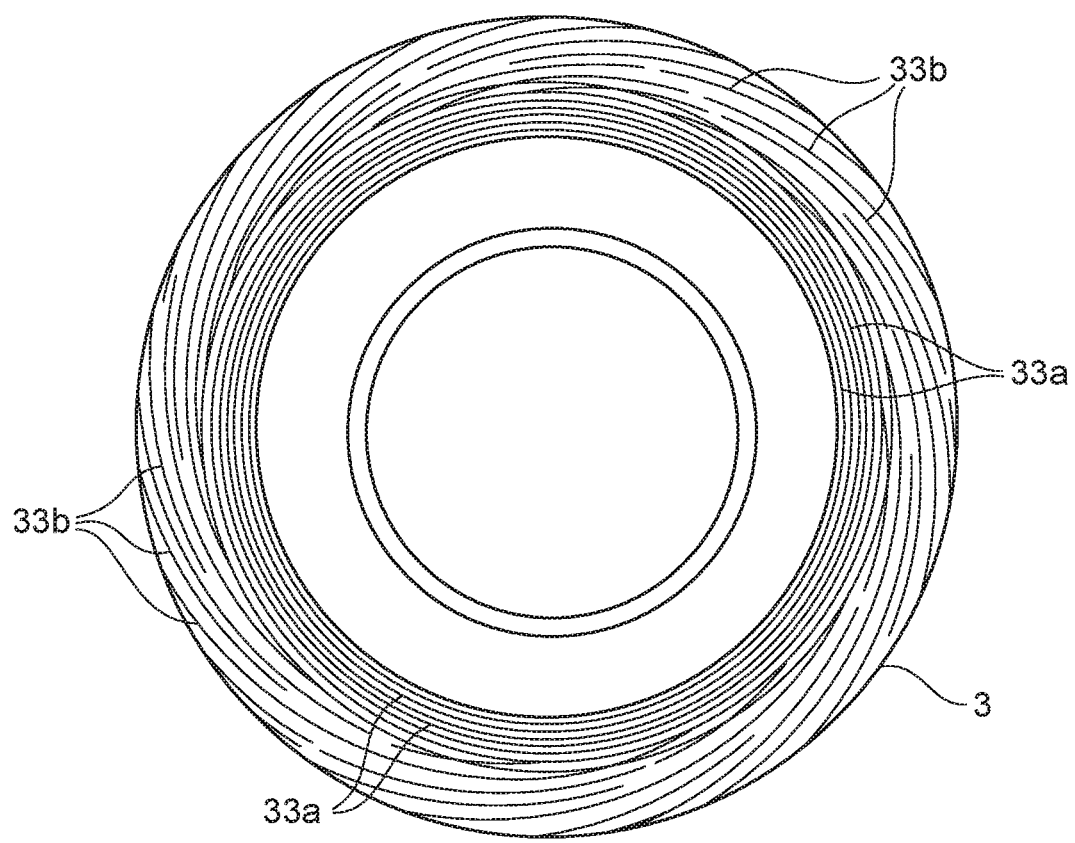
FIG. 3 A side view of a slinger in the sealing apparatus in FIG. 1, seen from outside.

As described above, an infinite number of (a plurality of) fine grooves 33 are formed on the outer side surface 31d of the slinger 3. In the present embodiment, as illustrated in FIG. 3, a plurality of grooves 33 are formed on the outer side surface 31d of the slinger 3. FIG. 3 is a schematic side view of the slinger 3 in the sealing apparatus 1 according to the embodiment of the present invention, seen from outside. Note that, while FIG. 3 is a schematic view for explanation where the fine grooves 33 are clearly illustrated as lines while density is lowered so as to allow recognition of existence of the fine grooves 33, actually, the grooves 33 are very fine and exist all over the surface with high density, and although it is possible to visually confirm that there are a number of lines, the grooves 33 are too dense and random to be illustrated in a drawing.

As illustrated in FIG. 3, an infinite number of grooves 33 with random intervals and lengths are formed in a spiral shape (with spiral planar curves) on the outer side surface 31d of the slinger 3. In detail, an infinite number of grooves 33a in a substantially circular shape are formed on an inner periphery side, and an infinite number of grooves 33b in a right-handed spiral shape gradually proceeding from the inner periphery side to an outer periphery side are formed beginning at the grooves 33a or independently of the grooves 33a, and the grooves 33b intersect with a portion contacted by the end-face lip 21. That is, the grooves 33b extend between the inner periphery side and the outer periphery side, and intersect with a lip contact portion 32 which is a portion where an outer periphery side disk portion 31b of the flange portion 31 of the slinger 3 contacts the end-face lip 21 on the outer side surface 31d.

In the microscopic sense, intervals of the grooves 33a and intervals of the grooves 33b are not constant, but random. Further, in the microscopic sense, the grooves 33a include grooves which have a substantially spiral shape as a result of positions being slightly displaced in a radial direction in each lap, and grooves which do not have a perfect circular shape by breaking halfway, in addition to grooves in a perfect circular shape. Further, in the microscopic sense, the grooves 33b include grooves whose spiral shapes are not completely the same as a result of breaking halfway, beginning at a location distant from the grooves 33a, or the like, in addition to grooves which begin at the grooves 33a and reach an outer edge on the outer side surface 31d of the slinger 3. However, generally, an infinite number of grooves 33a in a substantially circular shape are formed on the inner periphery side, and an infinite number of grooves 33b in a right-handed spiral shape gradually proceeding from the inner periphery side to the outer periphery side are formed.

Figure 4:
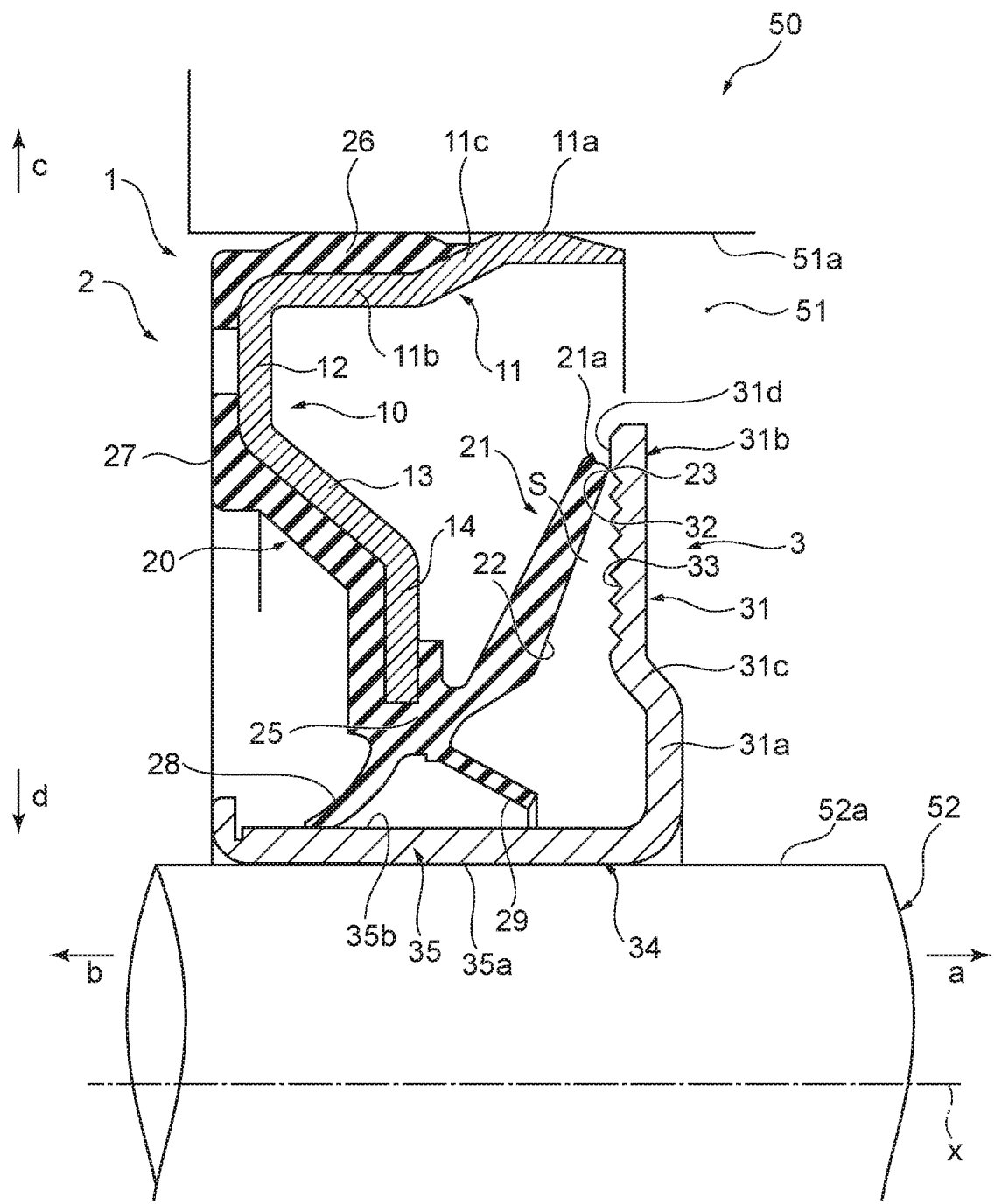
FIG. 4 Diagrams for explaining a shape of grooves, FIG. 4A illustrating a partially enlarged side view of the slinger when grooves adjacent to each other are seen from outside, and FIG. 4B illustrating a partially enlarged cross-sectional diagram illustrating a shape of the grooves on a cross-section along an axis line.

Action of the sealing apparatus 1 having the above-described configuration will be described next. FIG. 4 is a partially enlarged cross-sectional diagram of the sealing apparatus 1 in a usage state where the sealing apparatus 1 is attached to the housing 50 as an attachment target and the shaft 52 inserted into the shaft hole 51 which is a through-hole formed at the housing 50. The housing 50 is, for example, a front cover of an engine or a cylinder block and a crank case, and the shaft hole 51 is a crank hole formed at the front cover, or the cylinder block and the crank case. Further, the shaft 52 is, for example, a crank shaft.

As illustrated in FIG. 4, in the state where the sealing apparatus 1 is used, the sealing apparatus body 2 is fitted into the shaft hole 51 by being pressed into the shaft hole 51, and the slinger 3 is attached to the shaft 52 by being interference-fitted at the shaft 52. More specifically, the outer periphery side cylindrical portion 11a of the reinforcing ring 10 contacts the inner periphery surface 51a of the shaft hole 51, so that a shaft center of the sealing apparatus body 2 is made to match a shaft center of the shaft hole 51, and the gasket portion 26 is tightly adhered to the inner periphery surface 51a of the shaft hole 51 by the gasket portion 26 of the elastic body portion 20 being compressed in a radial direction between the inner periphery surface 51a of the shaft hole 51 and the inner periphery side cylindrical portion 11b of the reinforcing ring 10, so that sealing between the sealing apparatus body 2 and the shaft hole 51 is realized. Further, the cylindrical portion 35 of the slinger 3 is pressed into the shaft 52, and the inner periphery surface 35a of the cylindrical portion 35 is tightly adhered to the outer periphery surface 52a of the shaft 52, so that the slinger 3 is fixed at the shaft 52.

In a state where the sealing apparatus 1 is used, relative positions between the sealing apparatus body 2 and the slinger 3 in the axis line x direction are determined so that the end-face lip 21 of the elastic body portion 20 contacts the lip contact portion 32 which is a portion of the outer side surface 31d of the outer periphery side disk portion 31b of the flange portion 31 of the slinger 3 at the slinger contact portion 23 which is a portion on a side of the tip 21a of the inner periphery surface 22. A gap between the sealing apparatus body 2 and the slinger 3 is sealed by the end-face lip 21 contacting the flange portion 31, and leakage of the target to be sealed from the side of the target to be sealed is prevented. Further, a portion on the tip side of the dust lip 28 contacts the cylindrical portion 34 of the slinger 3 from the outer periphery side. The dust lip 28, for example, contacts the outer periphery surface 35*b* of the cylindrical portion 35 of the slinger 3.

Further, in the state where the sealing apparatus 1 is used, the plurality of grooves 33 formed at the outer periphery side disk portion 31*b* of the flange portion 31 of the slinger 3 provides pumping action in the case where the shaft 52 (slinger 3) rotates. By rotation of the shaft 52 (slinger 3), pumping action occurs in a region in the vicinity of the slinger contact portion 23 and the lip contact portion 32 in narrow space S which is space between the flange portion 31 and the end-face lip 21. By this pumping action, even in the case where the target to be sealed oozes from the side of the target to be sealed to the narrow space S, the target to be sealed which has oozed is returned from the narrow space S to the side of the target to be sealed beyond the slinger contact portion 23 and the lip contact portion 32. In this manner, by the pumping action occurring by the groove 33 formed at the flange portion 31 of the slinger 3, ooze of the target to be sealed to the narrow space S is suppressed.

Further, as described above, the grooves 33 intersect with the lip contact portion 32 which is a portion where the end-face lip 21 contacts the slinger 3, between the inner periphery side and the outer periphery side, and a gap extending between the inner periphery side and the outer periphery side is formed by the grooves 33, between the slinger contact portion 23 and the lip contact portion 32 which contact with each other. Therefore, in a state where the sealing apparatus 1 is at rest, while the shaft 52 is at rest, that is, the slinger 3 is at rest, it is considered that static leakage in which the target to be sealed oozes from the side of the target to be sealed through the grooves 33 may occur. However, in the present sealing apparatus 1, the grooves 33 formed at the slinger 3 are shallow grooves as described above, and the depth h of the grooves 33 is a small value. Therefore, in a state where the sealing apparatus 1 is at rest, occurrence of static leakage is prevented.

Further, it is conventionally known that pumping action based on the grooves of the slinger is reduced as rotation of the slinger becomes faster. It can be considered that this is because the pumping region contracts toward the side of the slinger contact portion and the lip contact portion as the rotation speed of the slinger becomes higher. Meanwhile, in the sealing apparatus 1, because an infinite number of grooves 33 are formed at the slinger 3, even in the case where rotation of the slinger 3 becomes faster, and the pumping action of the respective grooves 33 of the slinger 3 is reduced, it is possible to secure a pumping amount required for preventing ooze of the target to be sealed by the pumping action based on a number of grooves 33 formed at the slinger 3. Further, because an infinite number of grooves 33 are formed at the slinger 3, it is possible to improve pumping action based on the grooves 33 of the slinger 3 regardless rotational speed of the slinger 3.

The grooves 33 illustrated in FIG. 3 can be easily formed by employing a surface processing method of a disk member of a sealing apparatus of the present invention (hereinafter, referred to as a "surface processing method of the present invention" for brevity). The surface processing method of the present invention will be described below.

The surface processing method of the present invention is characterized by forming a plurality of fine spiral grooves on a surface of a disk member by a grinding member having a plurality of fine projections being moved to an outer edge side while the grinding member is pressed against the surface of the disk member which relatively rotates about a shaft. At this time, by using the slinger 3 as the disk member to be processed, it is possible to easily form the grooves 33 as illustrated in FIG. 3.

Figure 5:
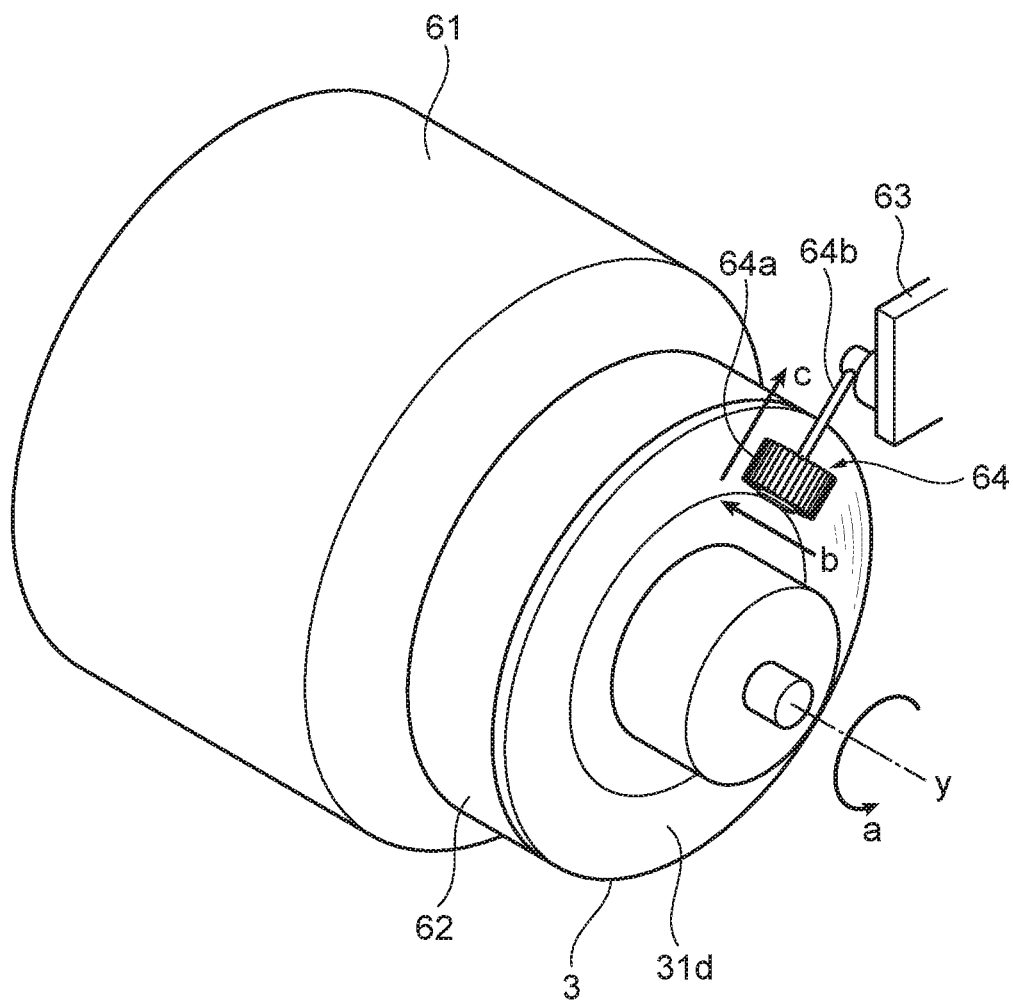
FIG. 5 A schematic perspective view of a processing apparatus to which a surface processing method of a disk member of a sealing apparatus of the present invention is applied.
Figure 6:
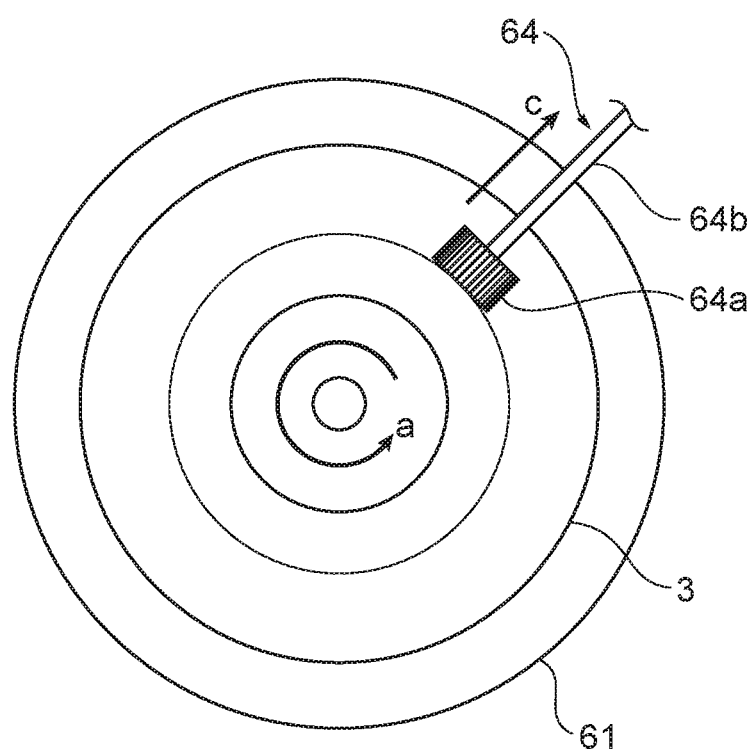
FIG. 6 A schematic front view of the processing apparatus in FIG. 5, seen from a front in an axis y direction.

FIG. 5 is a schematic perspective view of a processing apparatus 6 to which the surface processing method of the present invention is applied. FIG. 6 is a schematic front view of this processing apparatus 6 seen from a front in an axis y direction. This processing apparatus 6 includes a rotating apparatus 61, a rotating table 62, a movable arm 63, and a grinding tool (grinding member) 64.

The slinger 3 is set on the rotating table 62, and the slinger 3 is rotated in a direction of an arrow a around an axis y by rotating force of the rotating apparatus 61. Further, the grinding tool 64 is held by the movable arm 63 in a state where a polishing surface (in this example, an outer periphery of a polishing wheel portion 64*a*) faces the outer side surface 31*d* at the outer periphery side disk portion 31*b* of the slinger 3.

The rotating apparatus 61 has a function of rotating the rotating table 62, and is, for example, a CNC lathe. However, in the present invention, any apparatus may be used if the apparatus has a function of rotating the disk member to be processed via a holding tool such as the rotating table 62 or directly without involving a holding tool, and a dedicated rotating apparatus may be manufactured for the surface processing method of the present invention.

As illustrated in FIG. 5, the movable arm 63 is a movable member which can move in a direction of an arrow b toward the outer side surface 31*d* at the outer periphery side disk portion 31*b* of the slinger 3 and in an opposite direction away from the outer side surface 31*d*, and in a direction of an arrow c which proceeds to an outer edge side in a radial direction of the slinger 3 and in a direction returning to a center side.

The grinding tool 64 is formed with a shaft 64*b* and a polishing wheel portion 64*a* to which a plurality of pieces of abrasive cloth on which abrasive grains are applied are attached at tips of the shaft 64*b*, and the shaft 64*b* is attached to the movable arm 63, so that a target to be grinded can be ground (polished) by an outer periphery surface of the polishing wheel portion 64*a*. Examples of the polishing wheel portion 64*a* can include, for example, a Flap Wheel, a Mega Bright Wheel, or the like, manufactured by Ichiguchi Corporation. While a polishing wheel-type polishing tool is normally used while being rotated with its shaft attached to a rotating apparatus such as a grinder, in the surface processing method of the present invention, the polishing tool only requires to be able to be supported by the movable arm 63 without being rotated.

Note that the grinding tool 64 is not limited to a polishing wheel-type polishing tool as in the present example, and it is also possible to use, for example, any typical sandpaper, or the like, if a polishing material polishes a target to be ground while a polishing surface on which abrasive grains are applied is made to abut on the target to be ground. Further, while, in the present embodiment, the grinding tool is not limited to a polishing material, and it is also possible to use a grinding member having a plurality of fine projections, which will be described later, here an example using a polishing material will be described. Note that, in the present invention, "grinding" conceptually includes "polishing" using a polishing material on which fine grooves are randomly formed.

First, as processing preparation, the rotating apparatus 61 is powered on, and the slinger 3 is rotated in a counterclockwise direction (in a direction of the arrow a) along with the rotating table 62 (step 1). Then, by the movable arm 63 being moved in a direction of the arrow b, an outer periphery surface of the polishing wheel portion 64*a* of the grinding tool 64 is pressed against an inner periphery side on the outer side surface 31*d* of the slinger 3 with predetermined pressing force and is held as is until the slinger 3 rotates one or more revolutions (step 2). Through operation of this step 2, an infinite number of grooves 33*a* having a substantially circular shape are formed on the inner periphery side on the outer side surface 31*d* of the slinger 3.

Thereafter, by the movable arm 63 being moved in a direction of the arrow c at predetermined speed while the above-described predetermined pressing force is maintained, the grinding tool 64 is moved to an outer edge side in a radial direction of the slinger 3, and work is finished when the grinding tool 64 reaches the outer edge (step 3). Through this operation of step 3, an infinite number of grooves 33*b* having a right-handed spiral shape gradually proceeding from the inner periphery side to the outer periphery side are formed on the outer side surface 31*d* of the slinger 3.

As described above, it is possible to easily form the grooves 33 as illustrated in FIG. 3.

While grinding traces by the abrasive grains are formed as fine grooves 33 on the outer side surface 31*d* of the outer periphery side disk portion 31*b* of the slinger 3 because a polishing material which is obtained by applying abrasive grains for polishing on base cloth and which is fixed with an adhesive is used as the grinding tool 64, as a result of the abrasive grains being randomly arranged, dropping or moving on a surface of the polishing material, the grooves 33 have a random shape as described above, whose intervals (pitch) between the grooves 33 are not constant, and which include grooves whose shape does not match relative motion of the grinding tool 64 with respect to the slinger 3.

Note that, as a range in which the grinding tool 64 moves in the direction of the arrow c with respect to the slinger 3, the grinding tool 64 does not have to reach the outer edge of the slinger 3, and may stop halfway. There is no problem even if the grinding tool 64 does not reach the outer edge if the grooves 33 are formed so as to intersect with the lip contact portion 32 which is a portion of the slinger 3 contacted by the end-face lip 21 between the inner periphery side and the outer periphery side as a whole (not in terms of individual grooves).

In the above-described surface processing method, part of the operation in step 2 may be omitted. That is, the slinger 3 is rotated in a counterclockwise direction (in the direction of the arrow a) along with the rotating table 62 by the rotating apparatus 61 (step 1), then, by the movable arm 63 being moved in the direction of the arrow b, the outer periphery surface of the polishing wheel portion 64*a* of the grinding tool 64 is pressed against the inner periphery side on the outer side surface 31*d* of the slinger 3 with predetermined pressing force (step 2'), and, immediately after that, by the movable arm 63 being moved in the direction of the arrow c at predetermined speed while the above-described predetermined pressing force is maintained, the grinding tool 64 is moved to an outer edge side in the radial direction of the slinger 3, and work is finished when the grinding tool 64 reaches the outer edge (step 3).

Figure 7:
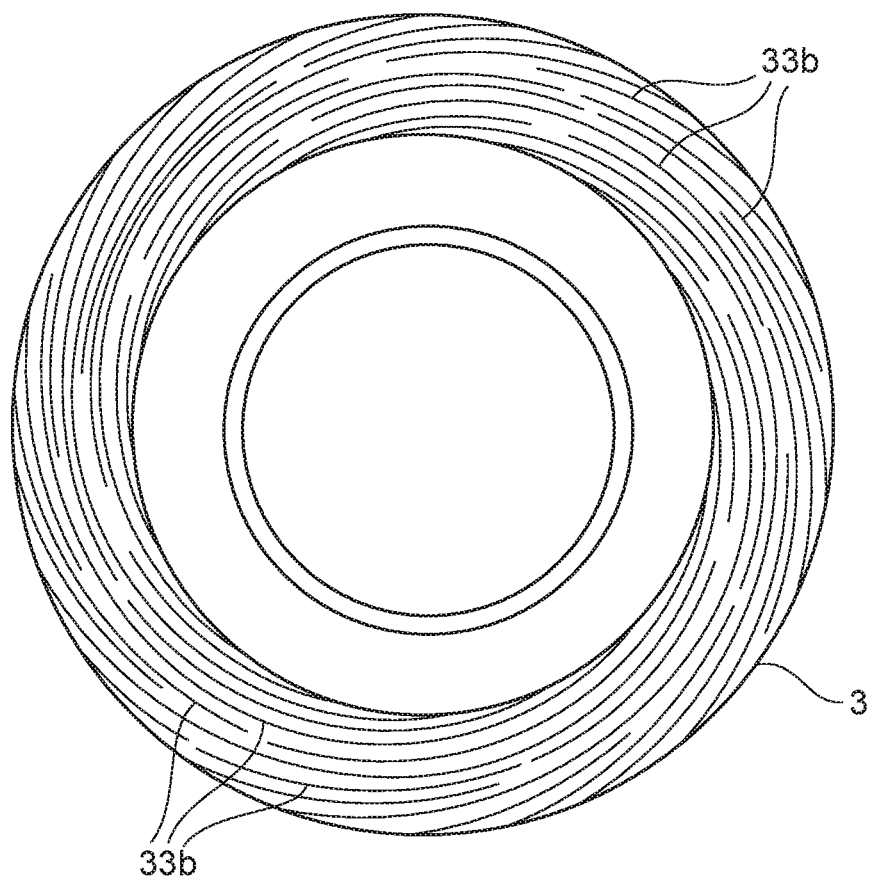
FIG. 7 A schematic side view illustrating a variant of a slinger in FIG. 3.

FIG. 7 illustrates a schematic side view of the slinger having the grooves which are formed as described above, seen from outside of the sealing apparatus in a similar manner to FIG. 3. Note that FIG. 7 is a schematic view for explanation in a similar manner to FIG. 3. As illustrated in FIG. 7, an infinite number of grooves 33*b* in a right-handed spiral shape gradually proceeding from the inner periphery side to the outer periphery side are formed on the outer side surface 31*d* of the slinger 3, and the grooves 33*b* intersect with a portion contacted by the end-face lip 21. That is, the grooves 33*b* extend between the inner periphery side and the outer periphery side, and intersect with the lip contact portion 32 which is a portion where the flange portion 31 of the slinger 3 contacts the end-face lip 21 on the outer periphery side surface 31*d* of the outer side disk portion 31*b*.

Note that the grooves 33*a* in a substantially circular shape on the inner periphery side, which are formed at the slinger 3 in FIG. 3, are not formed at the slinger 3 in FIG. 7. In this manner, even if the grooves 33*a* in a substantially circular shape on the inner periphery side are not formed, there is no problem if the grooves 33*b* are formed which extend between the inner periphery side and the outer periphery side and which intersect with the lip contact portion 32 which is a portion where the flange portion 31 of the slinger 3 contacts the end-face lip 21 on the outer side surface 31*d* of the outer periphery side disk portion 31*b*.

In any surface processing method, operation using the above-described surface processing method may be repeated a plurality of times. For example, if operation of one time is finished while moving speed of the movable arm 63 in the direction of the arrow c (there is a case where this movement will be referred to as "feeding" and the speed will be referred to as "feeding speed") is made higher to quickly move the grinding tool 64 to the outer edge side in the radial direction of the slinger 3, although it depends on a contact width of the grinding tool 64 in the radial direction of the slinger 3, a group of grooves is unicursally drawn in a spiral shape, that is, grooves are intermittently formed in the radial direction of the slinger 3. Therefore, it is preferable to repeat operation using the above-described surface processing method a plurality of times to fill portions where the grooves are not formed. Particularly, in the latter surface processing method which is a variant, because positions of starting points of the grooves 33*b* on the inner periphery side are likely to be irregular, to align this, it is possible to repeat the operation regardless of whether or not the grooves are intermittently formed.

Also in the former surface processing method for forming a surface in a groove shape illustrated in FIG. 3, operation of the latter surface processing method in which part of the operation in step 2 is omitted can be employed as operation of the second and subsequent times.

While a depth h of the grooves 33 can be adjusted in accordance with a size of abrasive grains of the polishing material as the grinding tool 64, the depth h can be adjusted as appropriate in accordance with other conditions. Specifically, for example, the grooves 33 tend to be shallower as rotational speed of the rotating table 62 and the slinger 3 by the rotating apparatus 61, that is, grinding (polishing) speed is higher, and tend to be deeper as the rotational speed is lower. Further, the grooves 33 tend to be shallower as the feeding speed is higher, and tend to be deeper as the feeding speed is lower. Still further, the grooves 33 tend to be shallower as the pressing force of the grinding tool 64 against the outer side surface 31*d* of the slinger 3 is made smaller, and tend to be deeper as the pressing force is made greater.

Therefore, first, by adjusting the above-described other respective conditions as appropriate using a polishing material having abrasive grains of a size in accordance with a target depth h of the grooves 33, specifically, a polishing material having abrasive grains having a radius of approximately 20 times to 50 times of the depth h, it is possible to finely adjust the depth h of the grooves 33. For example, in a case where the depth h of the grooves 33 is tried to be made 10 μm, it is only necessary to select a grain size (JIS B 4130 A scheme) from a range between #50 and #120 and finely adjust the depth h using other conditions.

As the grooves are shallower, that is, a value of the depth h of the grooves 33 is smaller, it is possible to suppress static leakage, so that static leakage prevention performance is higher. Further, as the number of threads n of the grooves increases, it can be considered that static leakage is more likely to occur because the number of locations of space which penetrates through the slinger contact portion 23 and the lip contact portion 32 increases. Therefore, because, at the grooves 33 formed using the polishing material as the grinding tool 64, the number of threads n is infinite, that is, extremely large, it can be considered that static leakage is likely to occur.

However, it has been found by the present inventors that it is possible to make static leakage unlikely to occur even if an infinite number of grooves 33 are formed by making the grooves 33 fine.

Because a specific size which can effectively suppress static leakage while realizing pumping action in a state where the sealing apparatus 1 is used changes depending on respective conditions such as a type (particularly, viscosity) of a target to be sealed, materials, sizes, shapes, or the like, of the elastic body portion 20 and the slinger 3, it is difficult to uniformly specify a value of the depth h of the grooves 33.

Assuming a case of use around an engine of a car, it is only necessary to confirm whether desired pumping action and a static leakage suppression effect can be realized while the depth h of the grooves 33 is set at equal to or less than 20 μm, that is, surface roughness Rz (JIS B 0601 2001) measured in a direction perpendicular to the grooves 33, on a surface on which the grooves 33 are formed, is set at equal to or less than 20 μm. There is no problem if desired pumping action and a static leakage suppression effect can be realized even if this surface roughness Rz exceeds 20 μm, and it is preferable that the surface roughness Rz is equal to or less than 20 μm because there is a higher possibility that the pumping action and the static leakage suppression effect can be realized, it is more preferable that the surface roughness Rz is equal to or less than 15 μm, and it is further more preferable that the surface roughness Rz is equal to or less than 10 μm. Further, because the pumping action is less likely to occur if the grooves are too fine, it is preferable that the surface roughness Rz is equal to or greater than 2 μm, and it is more preferable that the surface roughness Rz is equal to or greater than 4 μm.

Next, specifically confirmed results of static leakage prevention performance of the sealing apparatus 1 according to the present invention, including a slinger obtained by utilizing the surface processing method of the present invention will be described.

As the rotating apparatus 61, the processing apparatus 6 using a CNC lathe illustrated in FIG. 5 and FIG. 6 was prepared. As the slinger 3, iron and steel (corresponding to S45C) were used as a material, an outer diameter was set at 99.8 mmϕ, and the grooves 33 were formed in a region from a portion of a diameter of 87.8 mmϕ to an outer edge.

As the grinding tool 64, Mega Bright Wheel MBW5025 (manufactured by Ichiguchi Corporation) having a grain size of #80 was used. The grooves 33 were formed at the condition 3 on two conditions of a condition (condition 1) that spindle rotational speed of the rotating apparatus 61 was 1000 revolutions/minute, and feeding speed of the movable arm 63 was 2 mm/revolution and a condition (condition 2) that the spindle rotational speed was 500 revolutions/minute, and the feeding speed of the movable arm 63 was 10 mm/revolution.

As the surface processing method, a method was used such that part of the operation described above in step 2 was omitted, and the grooves 33b illustrated in FIG. 7 were formed. At this time, in the former condition 1, operation from step 1 to step 3 was performed only once, and in the latter condition 2, the same operation was performed four times, to obtain a processing surface with less variation.

When surface roughness of the slinger 3 obtained through the processing as described above was measured using a surface roughness meter indicating surface roughness of the processing surface, in the condition 1, the surface roughness Rz=14.6 μm, and in the condition 2, the surface roughness Rz=11.3 μm.

The obtained slinger 3 was incorporated into the sealing apparatus 1, and an evaluation test was performed under the following test conditions.

[Test Conditions]
Shaft eccentricity of the shaft 52: 0 mm T. I. R. (Total Indicator Reading)
Eccentricity of attachment (eccentricity of the shaft hole 51): 0 mm T. I. R. (Total Indicator Reading)
Plane deflection of the slinger 3: 0 mm (target value of processing)
Oil temperature: 40° C.
Oil type: 0W-8 (based on SEA standards, SAEJ300 engine oil viscosity classification (2015, January))
Oil amount: fullness
Rotational speed of the shaft 52 (slinger 3): 0 rpm The evaluation tests were performed by measuring a period until occurrence of leakage under the above-described test conditions was confirmed up to 1,000 hours. Further, the evaluation tests were performed at the evaluation apparatus in which a usage state as illustrated in FIG. 5 was created in a pseudo manner. In this evaluation apparatus, oil as the above-described target to be sealed was poured on the side of the target to be sealed, so that the whole of the sealing apparatus 1 was covered with oil on the side of the target to be sealed. As a result, leakage did not occur even after 1,000 hours had elapsed in both the condition 1 and the condition 2.

Further, an evaluation test of high-speed leakage stop was performed for the sealing apparatus 1 in which the obtained slinger 3 was incorporated. Specifically, the following test conditions were set.
Shaft eccentricity: 0.2 mmT.I.R.
Eccentricity of attachment: 0.2 mmT.I.R.
Plane deflection: 0 mm (target value of processing)
Oil type: 0W-20
Oil amount: center of shaft
Oil temperature: 120° C.
Rotational speed: 8,000 rpm A determination criterion of evaluation was set at 24 hours. Further, the evaluation test was performed at an evaluation apparatus in which a usage state as illustrated in FIG. 4 was made in a pseudo manner. At this evaluation apparatus, evaluation was performed at the above-described rotational speed by an oil as the above-described target to be sealed being poured on a side of the target to be sealed so that a central portion of the shaft soaked in the oil on the side of the target to be sealed.

As a result, leakage did not occur even after 24 hours had elapsed in both the condition 1 and the condition 2.

As described above, according to the sealing apparatus 1 according to the present invention including the slinger 3 obtained through the surface processing method of the disk member according to the embodiment of the present invention, it is possible to prevent static leakage of a target to be sealed without increasing sliding resistance to the shaft 52 (slinger 3).

While the surface processing method of the disk member of the sealing apparatus of the present invention and the sealing apparatus have been described above using the preferred embodiment and its variant, the surface processing method of the disk member of the sealing apparatus of the present invention and the sealing apparatus are not limited to the configurations of the above-described embodiment and its variant. For example, while, in the above-described embodiment, an example has been described where a surface of the grinding member, which abuts on a surface of a disk member is a polishing material on which abrasive grains are applied, the surface of the grinding member is not particularly limited if a plurality of fine projections are provided, and, for example, a grinding member on which a plurality of grinding blades are provided, or a grinding member on which a plurality of fine projections are formed may be used. At this time, the grinding blades or the projections may be aligned at intervals such that a distance between the grinding blades or between the projections becomes an equal interval or changes at a fixed rate, or may be randomly arranged.

In this manner, for example, even with a grinding member having a plurality of fine projections which are daringly formed, when a number of fine grooves are tried to be formed, it is possible to process the surface of the disk member more easily in a shorter period of time than in a case where grooves are formed in a spiral shape using one grinding member as in a case of use of a lathe apparatus. Of course, use of a polishing material as the grinding member is advantageous in that it is possible to form a number of grooves having a desired depth h easily and in a short period of time only by controlling a size of abrasive grains of the polishing material.

Further, while, in the above-described embodiment, the disk member (slinger 3) held on the rotating table 62 is rotated using the rotating apparatus 61, in the surface processing method of the disk member of the sealing apparatus of the present invention, because it is only necessary to relatively rotate the disk member, it is also possible to rotate the grinding member while fixing the disk member.

Further, while, in the above-described embodiment, the movable arm 63 is used to hold and move the grinding member (grinding tool 64) (in the direction of the arrow b and in the direction of the arrow c), in the surface processing method of the disk member of the sealing apparatus of the present invention, a worker may hold the grinding member with his/her hand and perform work of moving the grinding member.

A sealing apparatus to which the slinger obtained by the present invention can be applied, and the sealing apparatus of the present invention are not limited to the sealing apparatus 1 according to the above-described embodiment. Further, the respective components may be selectively combined as appropriate so as to provide at least part of the above-described problems and effects. Further, for example, the shapes, materials, arrangement, sizes, or the like, of the respective components in the above-described embodiments can be changed as appropriate in accordance with specific usage aspect of the present invention.

While, in the above-described embodiment, the surface of the disk member on which spiral grooves are formed using the surface processing method of the present invention is a plane perpendicular to a direction in which the grinding member is pressed, this surface may tilt or may constitute a curve. For example, referring to FIG. 1 and FIG. 2, the outer side surface 31d of the outer periphery side disk portion 31b on which the grooves 33 are provided may tilt in any direction from a direction perpendicular to the axis line x or may have a curve shape protruding or recessed outward. Further, even a sealing apparatus having a slinger in such a shape is, of course, included in the scope of the present invention if the sealing apparatus has a configuration of the sealing apparatus of the present invention.

Further, while, in the above-described sealing apparatus 1, description has been provided that the lip contact portion 32 contacted by the end-face lip 21 and the grooves 33 are formed at the flange portion 31 of the slinger 3 attached to the shaft 52, the lip contact portion and the grooves of the present invention are not limited to those formed at the flange portion of the slinger. The lip contact portion and the grooves may be formed using the surface processing method of the present invention at any portion and may have any shape and structure, if the grooves obtained by the surface processing method of the present invention can act as described above.

Figure 8:
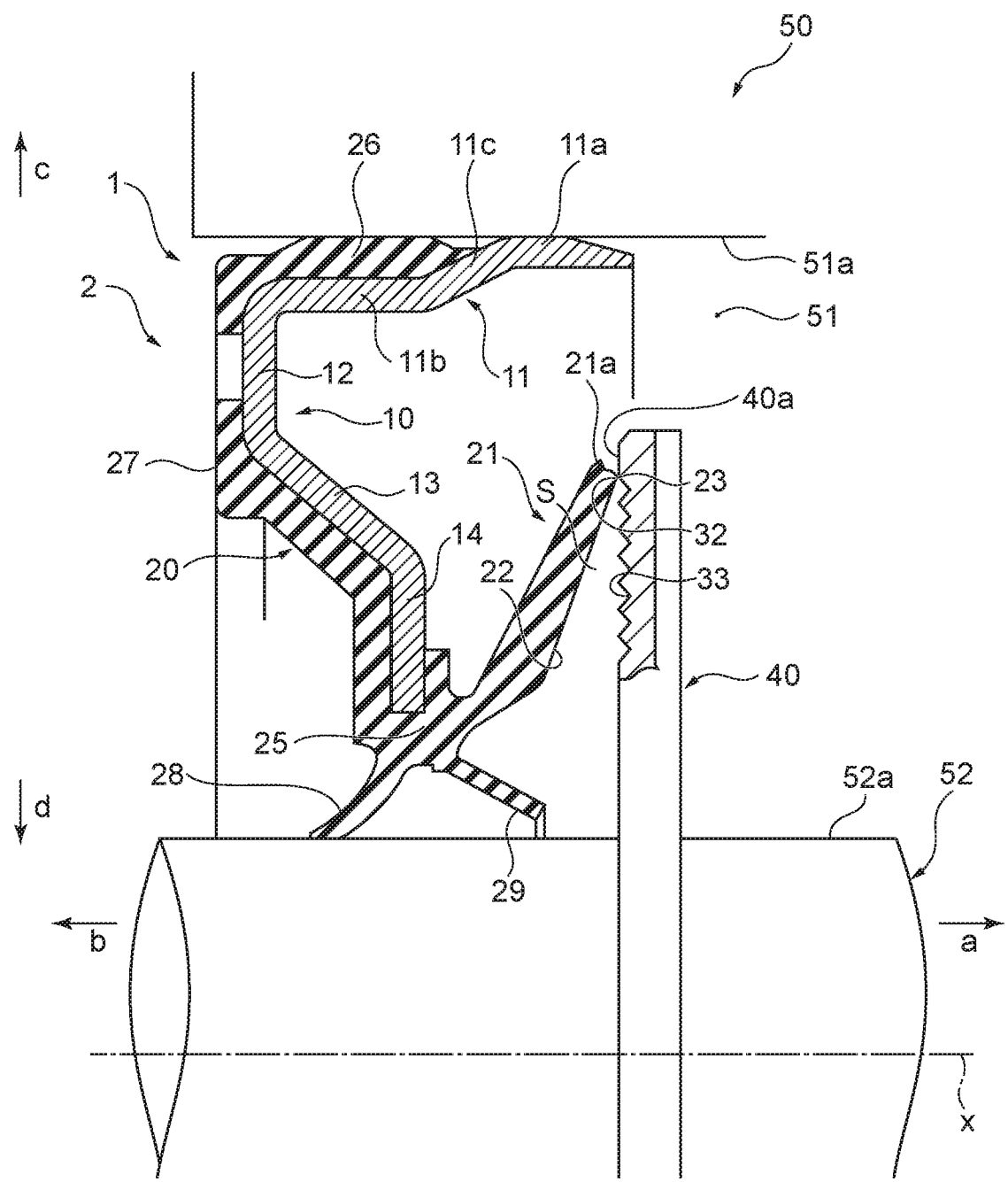
FIG. 8 A diagram for illustrating a modified example of a contact surface on which an end-face lip contacts in the sealing apparatus.

For example, as illustrated in FIG. 8, the lip contact portion 32 and the grooves 33 may be formed at a brim portion 40 which is integrally provided at the shaft 52. The brim portion 40 is a disk-shaped portion extending in a radial direction from the outer periphery surface 52a of the shaft 52, and has an outer side surface 40a which is a plane facing outside. The outer side surface 40a of the brim portion 40 corresponds to the outer side surface 31d of the flange portion 31 of the above-described slinger 3, and the end-face lip 21 contacts the outer side surface 40a at the slinger contact portion 23, and the lip contact portion 32 and the grooves 33 are formed on the outer side surface 40a. Further, in this case, the outer periphery surface 52a of the shaft 52 corresponds to the outer periphery surface 35b of the cylindrical portion 35 of the above-described slinger 3, and the dust lip 28 contacts the outer periphery surface 52a of the shaft 52. The dust lip 28 does not have to contact the outer periphery surface 52a of the shaft 52.

Figure 9:
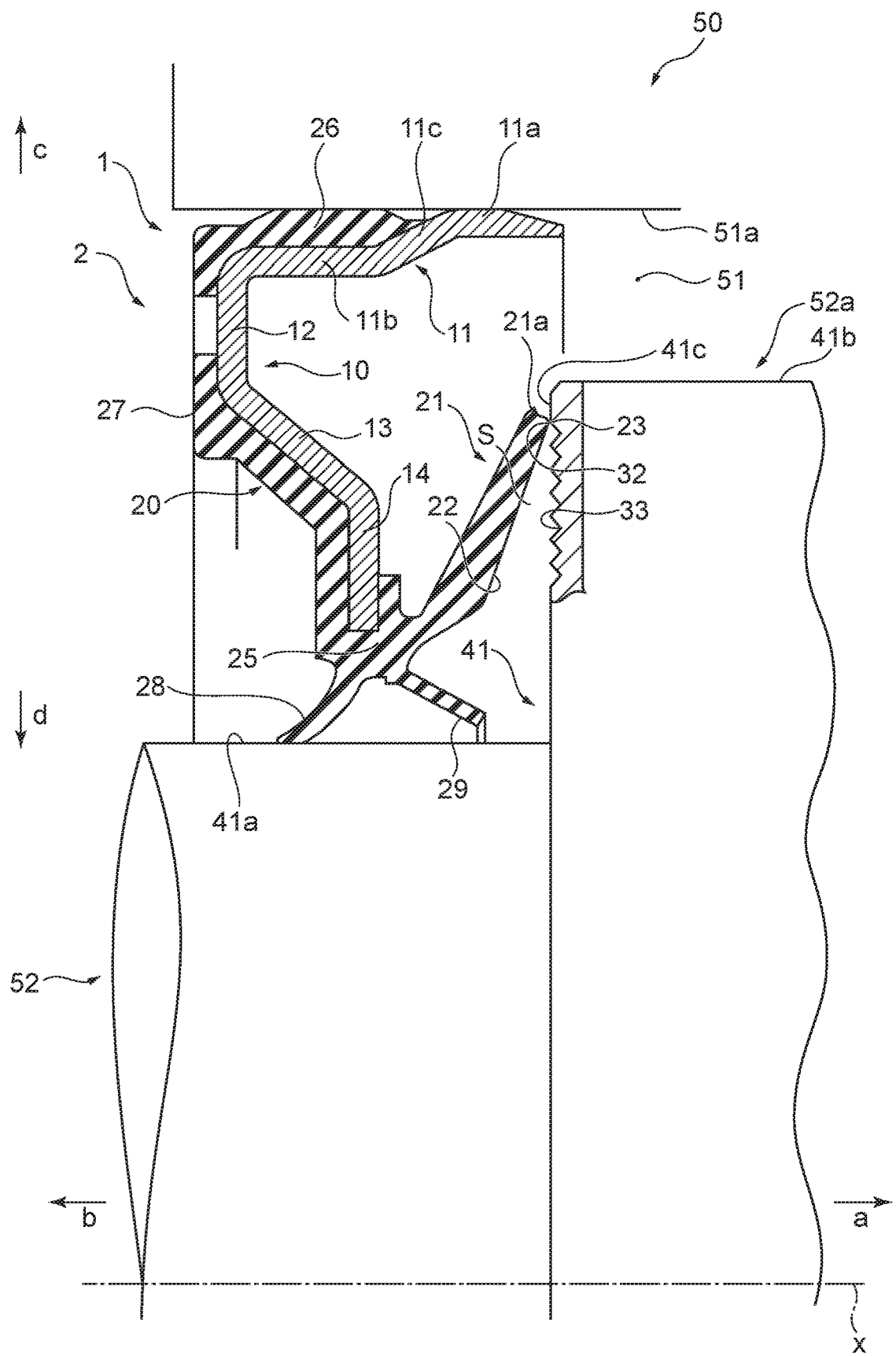
FIG. 9 A diagram for illustrating another modified example of the contact surface on which the end-face lip contacts in the sealing apparatus.

Further, as illustrated in FIG. 9, the lip contact portion 32 and the grooves 33 may be formed at a stepped portion 41 provided at the shaft 52. The stepped portion 41 is a portion where steps are formed on the outer periphery surface 52a of the shaft 52, and has an outer side outer periphery surface 41a which is an outer side portion on the outer periphery surface 52a, an inner side outer periphery surface 41b which extends on an inner side from the outer side outer periphery surface 41a, and a stepped surface 41c connecting the outer side outer periphery surface 41a and the inner side outer periphery surface 41b. The outer side outer periphery surface 41a and the inner side outer periphery surface 41b are cylindrical surfaces, and the inner side outer periphery surface 41b extends on the outer periphery side from the outer side outer periphery surface 41a. The stepped surface 41c of the stepped portion 41 is a plane which is orthogonal or substantially orthogonal to the axis line x, and corresponds to the outer side surface 31d of the flange portion 31 of the above-described slinger 3, and the end-face lip 21 contacts the stepped surface 41c at the slinger contact portion 23, and the lip contact portion 32 and the grooves 33 are formed on the stepped surface 41c. Further, in this case, the outer side outer periphery surface 41a of the outer periphery surface 52a of the shaft 52 corresponds to the outer periphery surface 35b of the cylindrical portion 35 of the above-described slinger 3, and the dust lip 28 contacts the outer side outer periphery surface 41a of the shaft 52. The dust lip 28 does not have to contact the outer side outer periphery surface 41a of the shaft 52.

Figure 10:
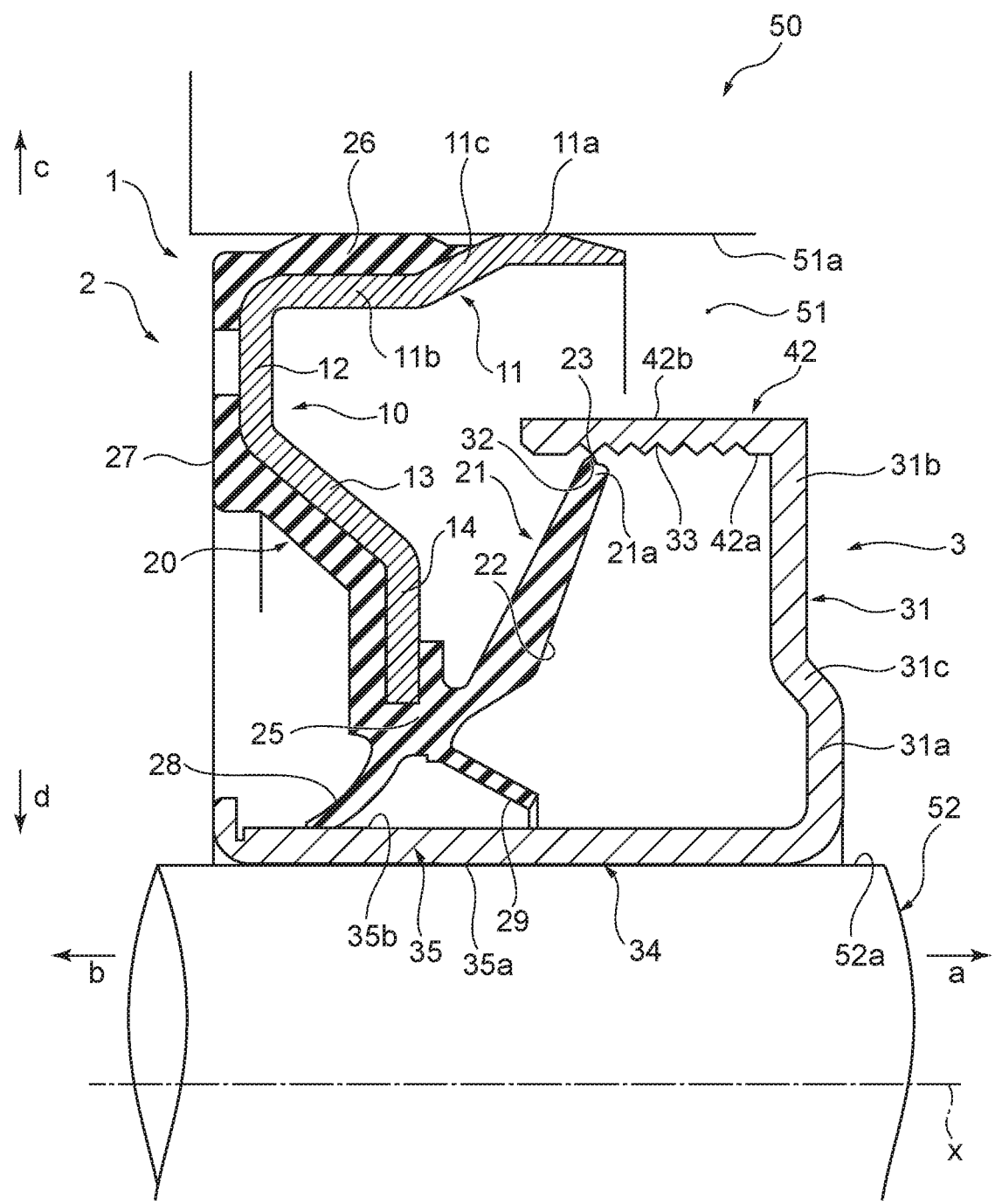
FIG. 10 A diagram for illustrating a still another modified example of the contact surface on which the end-face lip contacts in the sealing apparatus.

Further, the end-face lip is not limited to one which contacts a surface extending in the radial direction as the end-face lip 21 described above. The end-face lip may be one which contacts a cylindrical surface extending in the axis line x direction from the outer periphery side or from the inner periphery side as illustrated in FIG. 10. For example, as illustrated in FIG. 10, the flange portion 31 of the slinger 3 may have an outer periphery side cylindrical portion 42 extending toward an outer side along the axis line x from the end portion on the outer periphery side of the outer periphery side disk portion 31b. An inner periphery surface 42a which is a cylindrical surface is formed on a surface on the inner periphery side of the outer periphery side cylindrical portion 42, and this inner periphery surface 42a corresponds to the outer side surface 31d of the flange portion 31 of the above-described slinger 3, the end-face lip 21 contacts the inner periphery surface 42a at the slinger contact portion 23, and the lip contact portion 32 and the groove 33 are formed on the inner periphery surface 42a. An outer periphery surface 42b which is a cylindrical surface formed on a surface on the outer periphery side of the outer periphery side cylindrical portion 42 may correspond to the outer side surface 31d of the flange portion 31 of the above-described slinger 3. In this case, the end-face lip 21 contacts the outer periphery surface 42b at the slinger contact portion 23, and the lip contact portion 32 and the grooves 33 are formed on the outer periphery surface 42b. The outer periphery side cylindrical portion 42 illustrated in FIG. 10 may be respectively formed at the brim portion 40 and the stepped portion 41 respectively illustrated in FIG. 8 and FIG. 9. That is, the above-described inner periphery surface 42a or the outer periphery surface 42b may be respectively formed at the brim portion 40 and the stepped portion 41, and the lip contact portion 32 and the grooves 33 may be formed on the inner periphery surface 42a or the outer periphery surface 42b. In the case where the end-face lip 21 contacts the outer periphery surface 42b, an extending direction of the end-face lip 21 at the elastic body portion 20 is different from that illustrated in FIGS. 1, 2 and 4, and the end-face lip 21 extends while a diameter becomes smaller as progress from the outer side toward the inner side in the axis line x direction.

Further, while description has been provided thin the sealing apparatus 1 according to the present embodiments are applied to a crank hole of an engine, an application target of the sealing apparatus is not limited to this, and the present invention can be applied to all configurations which can utilize effects provided by the present invention, such as other vehicles, general-purpose machine and industrial machine. For example, the present invention can be applied to a transmission, a reducer, a motor and a differential mechanism In addition, a person skilled in the art can modify the surface processing method of the disk member of the sealing apparatus of the present invention and the sealing apparatus as appropriate in accordance with conventional well-known knowledge. The modified surface processing method and sealing apparatus are, of course, included in the scope of the present invention as long as the surface processing method and the sealing apparatus have the configurations of the present invention.

INDUSTRIAL APPLICABILITY

The surface processing method of the disk member of the sealing apparatus of the present invention can be utilized in a case where a plurality of fine spiral grooves are tried to be formed on surfaces of various kinds of disk members, which become sealing surfaces by a lip abutting in the sealing apparatus, as well as in a case where a slinger surface of the sealing apparatus to be used in a vehicle, general-purpose machine, or the like, is processed.

For example, the spiral grooves by the surface processing method of the disk member of the sealing apparatus of the present invention may be formed at a guard portion provided at a shaft such as a crank shaft of an engine. For example, grooves may be formed on a sealing surface 32 contacted by a lip 18 in FIG. 1 in Japanese Utility Model Laid Open No. 4-80967. This sealing surface 32 is provided at a guard portion which projects in a vertical direction from a shaft direction at the crank shaft of the engine.

Note that "fine" in a case of "fine grooves" in the present invention cannot be flatly specified because concept of "fine" is different depending on types of disk members to be processed. In a case of a slinger of a sealing apparatus, a degree which is sufficiently smaller than a typical depth (40 μm to 100 μm) as a groove disclosed in, for example, Patent Literature 1, specifically, a degree equal to or smaller than half is set as "fine".

Further, "fine" in a case of "fine projections" in the present invention cannot be flatly specified because "fine" indicates a size which is appropriate for forming "fine grooves". A size of "fine projections" is typically larger than a depth of "fine grooves" to be formed, and is a size at least equal to or larger than the degree of the depth.

LIST OF REFERENCE SIGNS 1 sealing apparatus
2 sealing apparatus body
3 slinger
6 processing apparatus
10 reinforcing ring
11 cylindrical portion
11a outer periphery side cylindrical portion
11b inner periphery side cylindrical portion
11c connecting portion
12 disk portion
13 conical ring portion
14 disk portion
20 elastic body portion
21 end-face lip
21a tip
22 inner periphery surface
23 slinger contact portion
25 base portion
26 gasket portion
27 rear cover portion
28 dust lip
29 intermediate lip
21 end-face lip
31 flange portion
31a inner periphery side disk portion
31b outer periphery side disk portion
31c connecting portion
31d outer side surface
32 lip contact portion
33, 33a, 33b groove
33a bottom surface
34 cylindrical portion
35 cylindrical portion
35a inner periphery surface
35b outer periphery surface 40 brim portion
40a outer side surface
41 stepped portion
41a outer side outer periphery surface
41b inner side outer periphery surface
41c stepped surface
42 outer periphery side cylindrical portion
42a inner periphery surface
42b outer periphery surface
50 housing
51 shaft hole
51a inner periphery surface
52 shaft
52a outer periphery surface
61 rotating apparatus
62 rotating table
63 movable arm
64 grinding tool (grinding member)
64a polishing wheel portion
64b shaft
x axis line

The invention claimed is:

1. A surface processing method of a disk member of a sealing apparatus for forming a plurality of fine spiral grooves on a surface of the disk member provided at the sealing apparatus, the surface processing method comprising:

moving a grinding member having a plurality of fine projections to an outer edge side while pressing the grinding member against the surface of the disk member which relatively rotates around a shaft, wherein a polishing material which is obtained by applying abrasive grains for polishing on base cloth and which is fixed with an adhesive is used as the grinding member, and wherein, as a result of the abrasive grains being randomly arranged, dropping or moving on a surface of the polishing material, the grooves have a random shape where intervals between the grooves are not constant and where relative motion of the grinding member with respect to the disk member and shapes of the grooves does not match, and wherein the grooves include grooves which have positions being displaced in a radial direction in each lap, grooves which break halfway, and grooves whose spiral shapes are not the same.

2. The surface processing method of the disk member of the sealing apparatus according to claim 1, wherein a surface of the grinding member, which abuts on the surface of the disk member is the polishing material.

3. The surface processing method of the disk member of the sealing apparatus according to claim 1, wherein, after the disk member rotates one or more revolutions while the grinding member is pressed against the surface of the disk member, the grinding member is moved to the outer edge side of the disk member.

4. The surface processing method of the disk member of the sealing apparatus according to claim 1, wherein the disk member is a slinger which is provided at the sealing apparatus for realizing sealing of an annular gap between a shaft and a hole into which the shaft is to be inserted, along with a sealing apparatus body fitted into the hole, and which is attached to the shaft, the sealing apparatus body includes a reinforcing ring which is annular around an axis line, and an elastic body portion which is formed with an elastic body attached to the reinforcing ring and which is annular around the axis line, the slinger includes a flange portion which is a portion extending toward an outer periphery side and annular around the axis line, the elastic body portion includes an end-face lip which is a lip extending toward one side in an axis line direction, contacting the other side surface of the flange portion in the axis line direction and annular around the axis line, and a surface against which the grinding member is to be pressed is the other side surface of the flange portion of the slinger.

5. A sealing apparatus for realizing sealing of an annular gap between a shaft and a hole into which the shaft is to be inserted, the sealing apparatus comprising:

a sealing apparatus body fitted into the hole; and
a slinger attached to the shaft, wherein the sealing apparatus body includes a reinforcing ring which is annular around an axis line, and an elastic body portion which is formed with an elastic body attached to the reinforcing ring and which is annular around the axis line, the slinger includes a flange portion which is a portion extending toward an outer periphery side and which is annular around the axis line, the elastic body portion includes an end-face lip which is a lip extending toward one side in an axis line direction, contacting the other side surface of the flange portion in the axis line direction, and annular around the axis line, and a plurality of fine spiral grooves are randomly formed on the other side surface of the flange portion of the slinger, wherein the grooves include grooves which have positions being displaced in a radial direction in each lap, grooves which break halfway, and grooves whose spiral shapes are not the same.

6. The sealing apparatus according to claim 5, wherein a depth of the grooves falls within a range between 2 μm and 20 μm.

* * * * *